United States Patent [19]
Arai

[11] 4,090,134
[45] May 16, 1978

[54] COMBINATED TRANSCEIVER, CARTRIDGE TAPE PLAYER AND RADIO UNIT

[75] Inventor: Kazuo Arai, Kitamoto, Japan

[73] Assignee: Nissan Denshi Kabushiki Kaisha, Ohmiya, Japan

[21] Appl. No.: 678,544

[22] Filed: Apr. 20, 1976

[30] Foreign Application Priority Data

Dec. 29, 1975　　Japan .............................. 50/177778

[51] Int. Cl.² .......................... F16H 35/18; H03J 5/00
[52] U.S. Cl. ........................................ 325/15; 325/25; 325/355; 179/100.11; 325/312
[58] Field of Search .................. 325/15, 16, 111, 311, 325/312, 355, 25, 352; 312/7 R; 224/42.42 R; 179/100.11

[56] References Cited

U.S. PATENT DOCUMENTS

| | | | |
|---|---|---|---|
| 3,059,184 | 10/1962 | Germain | 325/312 X |
| 3,827,772 | 8/1964 | Johnson | 224/42.42 R X |
| 3,947,766 | 3/1976 | Kawasaki | 325/25 |
| 4,032,844 | 6/1977 | Imazeki | 325/25 X |
| 4,034,164 | 7/1977 | Westmoland | 179/100.11 |
| 4,045,739 | 8/1977 | Kawasaki | 325/15 |

FOREIGN PATENT DOCUMENTS 1,226,713　3/1971　United Kingdom ................. 325/311

OTHER PUBLICATIONS

Acme Specialty Mfg. Co., New Product Bulletin, Apr. 10, 1975.
The Changing World of AR Automatic Radio, 1968 Catalog.
Heathkit, Sep. 1976 Catalog; p. 76.

*Primary Examiner*—John C. Martin
*Assistant Examiner*—Aristotelis M. Psitos
*Attorney, Agent, or Firm*—Wills, Green & Mueth Law Corporation

[57] ABSTRACT

A radio assembly to be installed in a motor vehicle and including a thin box-shaped radio broadcast receiver having a built-in cartridge tape player, a transceiver having a main section of hook-shaped box form attached to the rear of the receiver and having a separate operating section, and a microphone carrying that operating section.

5 Claims, 2 Drawing Figures

COMBINATED TRANSCEIVER, CARTRIDGE TAPE PLAYER AND RADIO UNIT

BACKGROUND AND BRIEF SUMMARY OF THE INVENTION

This invention relates to an assembly including a combined radio broadcast receiver, transceiver unit and cartridge tape player adapted to be mounted in the dashboard of an automobile or other motor vehicle.

Combination radio units of this type must necessarily be very restricted in size in order to be mountable within the dashboard of a vehicle. When thus limited as to overall size, it becomes extremely difficult to satisfactorily incorporate the transceiver and cartridge tape player into the main radio unit. In some conventional types of combination radio, transceiver and tape player assemblies incorporated in a single housing, circuits are so overcrowded that even a screw driver can not be inserted into the circuitry when repairs or adjustments are required. As a result, when operational difficulties are encountered or adjustments are required in the unit, correction of the problem is often so difficult that the entire assembly is removed from the dashboard and replaced with a new set, at considerable cost and with great inconvenience.

An object of this invention is to provide an improved combination radio, transceiver and cartridge tape player constructed to avoid the disadvantages of prior art devices as set forth above. Other objects and advantages of the invention will be apparent from a consideration of the following description and attached drawing.

This invention provides an improved combination automobile radio assembly of the discussed general type, in which the radio broadcast receiver has a built-in cartridge tape player but is formed separately from an associated transceiver unit, with the transceiver in turn being divided into a main function unit, that is, a transmitting and receiving unit, and an operating unit. The function unit of the transceiver is shaped as a relatively thin hook-shaped box which may be attached by connector members to the rear of the radio broadcast receiver and be set in the dashboard with the broadcast receiver. The operating unit of the transceiver is associated with or connected to a microphone whose cord extends from the function unit of the transceiver.

The unique assembly of the invention has an enormous advantage over conventional radio, transceiver and tape player devices since the conventional centralized circuit is functionally separated into different radio broadcast receiver and transceiver sections which can be readily repaired or adjusted when necessary. Further, if one of these sections becomes inoperable, the other may still function properly. Additionally, the separate construction of the function unit and operating unit of the transceiver permits a reduction in size of the portion of the transceiver which must be mounted in the dashboard, and increases the practicability of the overall arrangement.

BRIEF DESCRIPTION OF THE DRAWING

The invention will be more fully understood from the following detailed description of a typical embodiment illustrated in the accompanying drawing in which.

DETAILED DESCRIPTION OF THE PREFERRED EMBODIMENT

Figure 1:
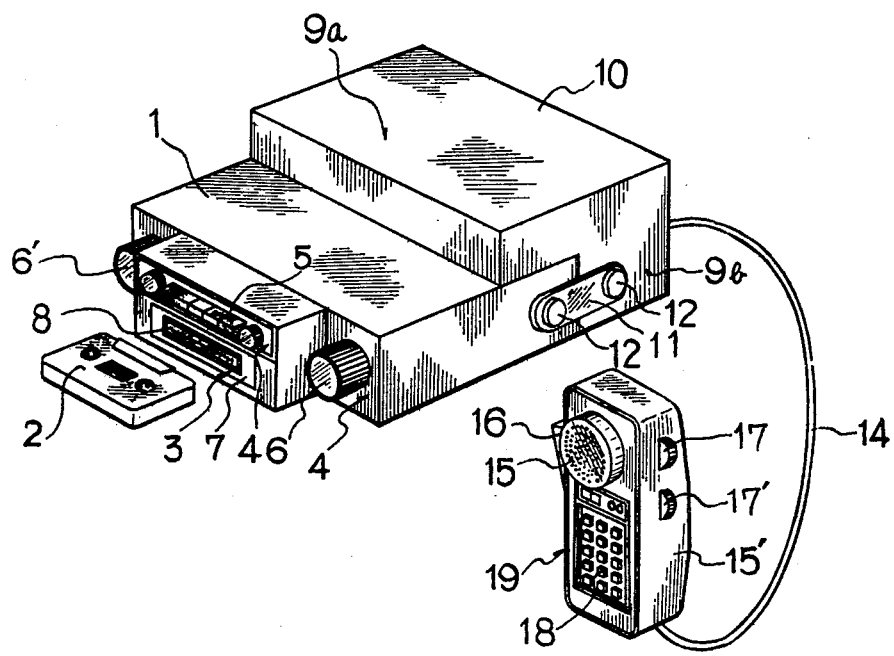
FIG. 1 is a perspective view of an assembled radio receiver, transceiver and cartridge tape player constructed in accordance with the invention.

Referring now to the drawing and, in particular, to FIG. 1, there is illustrated one form of combination radio, transceiver and cartridge tape player embodying the invention. A radio broadcast receiver 1 with a built-in cartridge tape player has a thin box type housing, on the front of which there is fitted a control panel 4 of a forwardly projected smaller box form. Panel 4 is provided with a series of push-button switches 5 for operating and controlling a cartridge form magnetic tape, a pair of tuning and volume and on-off knobs 6 and 6' for the radio receiver, and an entrance opening 3 through which a tape cartridge can be inserted into and removed from a recess in the receiver. The entrance opening 3 is equipped with a cover 7 having a dial scale 8 on which broadcasting frequencies are printed to be readable from the outside thereof.

As shown in FIG. 1, a function unit 10 of the transceiver is of a hook-shaped box form, including a relatively thin box-shaped horizontal part 9a and a vertical box-shaped part 9b. Unit 10 is fitted on and connected to the rear of radio receiver 1, being attached by a coupling plate 11 and two fitting shafts or fasteners 12 connecting opposite ends of plate 11 to the housings of units 1 and 10 respectively. To the function unit 10 of the transceiver is connected a flexible microphone cord 14 of a suitable length composed of a bundle of insulated electrically conductive lead wires for different purposes. A microphone 15 is connected to the outer end of this cord and is built into a microphone case 15' in which is also mounted an operating unit 19 for the transceiver, this unit being composed of a switch 16, adjusting knobs 17 and 17' and a set of push button-switches 18.

The radio and cartridge tape player are placed in operation and controlled by manual actuation of the various controls on panel 4 and by placing a tape cartridge 12 in the entrance opening 3. The transceiver 10 is placed in operation and controlled by actuation of the switch 16, knobs 17 and 17' and push buttons 18 of hand held unit 19.

Figure 2:
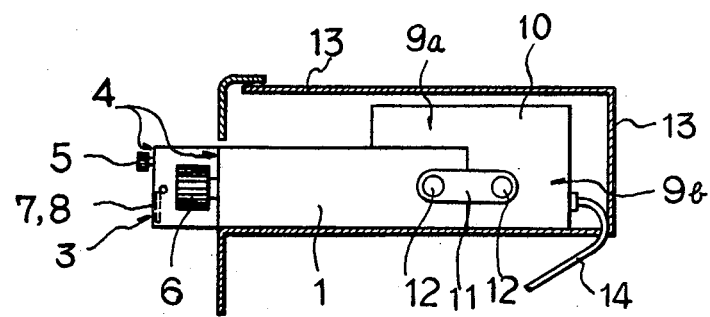
FIG. 2 is a side elevational view partially broken away of the assembly set in a dashboard.

The radio unit 1 carrying the function unit 10 of the transceiver and containing the built-in cartridge tape player, all assembled as illustrated, are fitted into the dashboard 13 of an automobile or other motor vehicle as seen in FIG. 2. Both the radio receiver 1 and the function unit 10 of the transceiver are made as thin and compact as feasible, so that they may be easily fitted into any dashboard of not only a relatively large sized automobile, truck or other motor vehicle, but also a light or small sized vehicle such as a compact car. According to the invention, it has thus become possible to fit a function or working unit of a transceiver into the dashboard of an automobile more effectively than with prior arrangements, by forming an associated radio receiver with a built-in cartridge tape player, and by separating the function unit from the operating unit of the transceiver, with the radio and function unit assembly then being adapted to be fitted into the dashboard of an automobile very easily because of their compact overall form and size even if the internal space of the dashboard is very small and tight. Further, the assembly of the invention by separating the radio and transceiver circuits can be designed to minimize operational difficulties, and as discussed can facilitate repairs to the separate and discrete circuits of the transceiver and radio receiver.

What is claimed is:

1. The combination comprising:

a combined radio broadcast receiver and tape player including a first housing adapted to be connected into the dashboard of an automobile, a radio receiver circuit in said housing, a cartridge tape player in the housing having an opening at a front side of the housing through which a tape cartridge is insertible, and control means at said front side of said housing for operating said radio receiver and said tape player;

a separately formed second housing connected to the rear of said first housing;

transmitting and receiving circuitry of a transceiver in said second housing;

said second housing having a rear portion extending generally vertically at the back of said first housing and having an upper portion extending forwardly from said rear portion above said first housing;

a manually held unit including a microphone and manually operable means for controlling said microphone and said transmitting and receiving circuitry of said transceiver; and a flexible electrical cord extending from said transceiver in said second housing to said microphone unit.

2. The combination as recited in claim 1, including means for detachably securing said second housing to said first housing.

3. The combination as recited in claim 1, including coupling means at a side of said first and second housings, and means for securing opposite ends of said coupling means to said first housing and said second housing respectively to secure said housings together.

4. The combination as recited in claim 1, including a coupling member having a forward portion at a side of said first housing and having a rear portion projecting to a location at a side of said rear vertically extending portion of said second housing, and connectors securing said forward and rear portions of said coupling member to said first and second housings respectively.

5. The combination as recited in claim 1, in which said manually operable means include a first switch, a plurality of pushbutton switches, and additional adjusting means.

* * * * *